US012303458B2

(12) United States Patent
Wirth et al.

(10) Patent No.: US 12,303,458 B2
(45) Date of Patent: May 20, 2025

(54) THERMAL DEVICE AND METHOD FOR OPERATING SAME

(71) Applicant: FIT- & WELLNESS CONCEPT GMBH, Wilen b. Wollerau (CH)

(72) Inventors: Daniel Wirth, Wetzikon (CH); Flurin Cabalzar, Hittnau (CH)

(73) Assignee: FIT- & WELLNESS CONCEPT GMBH (CH)

( * ) Notice: Subject to any disclaimer, the term of this patent is extended or adjusted under 35 U.S.C. 154(b) by 410 days.

(21) Appl. No.: 17/624,406

(22) PCT Filed: Mar. 28, 2020

(86) PCT No.: PCT/EP2020/058879
§ 371 (c)(1),
(2) Date: Sep. 26, 2022

(87) PCT Pub. No.: WO2021/001067
PCT Pub. Date: Jan. 7, 2021

(65) Prior Publication Data

US 2023/0000721 A1 Jan. 5, 2023

(30) Foreign Application Priority Data

Jul. 4, 2019 (CH) .................................... 00881/19
Feb. 7, 2020 (CH) .................................... 00138/20

(51) Int. Cl.
*A61H 33/06* (2006.01)

(52) U.S. Cl.
CPC ..... *A61H 33/066* (2013.01); *A61H 2033/068* (2013.01); *A61H 2201/5082* (2013.01)

(58) Field of Classification Search
CPC .............. A61H 33/06; A61H 2033/068; A61H 2201/2082
(Continued)

(56) References Cited

U.S. PATENT DOCUMENTS 4,446,356 A * 5/1984 Rimmi ................. A61H 33/063 392/386
6,681,417 B2 * 1/2004 Brunelle .............. A61N 5/0618 4/525
(Continued)

FOREIGN PATENT DOCUMENTS

AT 501018 B1 7/2008
DE 19539348 C1 11/1996
(Continued)

*Primary Examiner* — Huyen D Le
(74) *Attorney, Agent, or Firm* — Agris & von Natzmer LLP; Joyce von Natzmer

(57) ABSTRACT

A thermal device comprising a heatable and ventilatable thermal cabin (2) for at least one person is equipped with adjustable heating means (4) and with adjustable ventilation means (6) and, optionally, with a temperate sensor (8). Furthermore, detection means (10) are available for the continuous detection of the presence of persons situated in the thermal cabin, wherein said detection means interact with a heating control device (12) for the heating means (4). Due to the fact that a base heating power can be set when no one is present and that a comparatively higher operational heating power can be set when someone is present, the energy requirement when operating the thermal facility can be reduced considerably.

19 Claims, 5 Drawing Sheets

(58) Field of Classification Search
USPC .............................................................. 4/524
See application file for complete search history.

(56) References Cited

U.S. PATENT DOCUMENTS

| | | | | |
|---|---|---|---|---|
| 2002/0134849 | A1 | 9/2002 | Disser | |
| 2009/0056009 | A1* | 3/2009 | Matsubara | A61H 33/063 4/524 |
| 2011/0046702 | A1 | 2/2011 | Duncan | |
| 2015/0370272 | A1 | 12/2015 | Reddy et al. | |
| 2017/0051934 | A1 | 2/2017 | Verhoeven et al. | |
| 2017/0273865 | A1 | 9/2017 | Duncan | |
| 2017/0281465 | A1* | 10/2017 | Takao | B05B 5/00 |
| 2017/0321920 | A1 | 11/2017 | Rosen | |
| 2018/0036200 | A1* | 2/2018 | Wilkinson | A61H 33/06 |
| 2019/0238957 | A1* | 8/2019 | Yli-Kovero | H04Q 9/00 |
| 2021/0177695 | A1* | 6/2021 | Partsch | A61H 33/6005 |

FOREIGN PATENT DOCUMENTS

| | | | |
|---|---|---|---|
| DE | 19846678 | A1 | 4/2000 |
| DE | 202008002313 | U1 | 4/2008 |
| DE | 202006020386 | U1 | 7/2008 |
| DE | 202009000500 | U1 | 3/2010 |
| EP | 2272481 | A1 | 1/2011 |
| JP | S591099022 | A | 6/1984 |
| JP | 2006275393 | A | 10/2006 |
| RU | 129396 | U1 | 6/2013 |
| WO | 2017116077 | A1 | 7/2017 |
| WO | 2018065671 | A1 | 4/2018 |
| WO | 2018191703 | A1 | 10/2018 |

* cited by examiner (Prior art)

THERMAL DEVICE AND METHOD FOR OPERATING SAME

CROSS-REFERENCE TO RELATED APPLICATIONS

This is the U.S. national stage of international application no. PCT/EP2020/058879, filed Mar. 28, 2020 designating the United States and claiming priority to Swiss patent application no. CH 00881/19, filed Jul. 4, 2019 and Swiss patent application no. CH 00138/20, filed Feb. 7, 2020, which are incorporated herein in their entirety.

TECHNICAL FIELD

The invention relates to a thermal device according to the preamble of claim 1 and to a method for operating the same.

PRIOR ART

Thermal devices such as saunas, steam baths, etc. are nowadays used on a large scale and form a fundamental aspect of today's leisure, hotel and sports infrastructure. The energy consumption associated with the operation of such facilities is considerable and implies a need for optimization from both an ecological and economic point of view. In particular, there is the problem of varying occupancy numbers over the course of a day. Depending on the type of facility, time of day, day of week and/or season, some facilities may alternate between periods of vacancy and periods of high occupancy.

DE19846678A1 relates to a generic thermal device. In particular, a commercially usable larger bathing cabin for saunas or steam bathing is described therein, which is operated over longer periods with fluctuating occupancy. In order to save heating energy, the air flow rate is adapted to the occupancy density, whereby this is accomplished by corresponding sensors, which utilize body weight or body contours for switching operations.

DESCRIPTION OF THE INVENTION

The object of the invention is to provide an improved thermal device, which, in particular, allows for a further reduction in energy consumption. A further object of the invention is to provide a method for operating the thermal device according to the present invention.

These objects are achieved by the thermal device defined in claim 1 and by the method defined in claim 7.

The thermal device according to the present invention comprises a heatable and ventilatable thermal cabin for at least one person, wherein the thermal cabin is equipped with adjustable heating means and with adjustable ventilation means and, optionally, with a temperate sensor. Due to the fact that detection means for the continuous detection of the presence of persons situated in the thermal cabin, wherein said detection means interact with a heating control device for the heating means in such manner that a base heating power is set when no one is present and that a comparatively higher operational heating power is set when someone is present, the energy requirement can be reduced by a surprising amount, in particular in case of fluctuating occupancy.

In accordance with the above approach, in the method according to the present invention, the heating means are operated with a base heating power when no one is present and are operated with a comparatively higher operational heating power when someone is present.

In the present context, "thermal device" is to be understood as a collective term for any devices into which one or more persons access an environment of elevated temperature and possibly humidity for a certain period of time. Moreover, the term "thermal cabin" is to be understood quite generally as a well-defined room of the thermal device in which the said temperature and humidity environment is established and maintained. In addition to one, or optionally several, thermal cabin(s), the thermal device generally comprises further rooms and areas such as an entrance area, cloakroom, sanitary facilities and relaxation/break room(s).

Accordingly, the present invention is used in particular in connection with hot air baths, saunas, steam baths and infrared cabins in all their embodiments. Accordingly, it is also understood that the heating power to be applied generally depends strongly on the size and type, but also on the construction of the respective thermal device. In certain cases, the device can be operated with a base heating power of zero, i.e., when no one is present, there is no heating at all. Moreover, it is understood that the device according to the present invention does not necessarily have to be operated according to the method of the present invention all around the clock.

In general, it should be noted that the extent of the reduction in heating power when no one is present compared to the operational heating power, and thus also the extent of the achievable energy savings, depends on a number of factors. This includes, in particular, the size and construction of the thermal cabin, but also the type of thermal cabin and the temperature range generally considered to be acceptable.

Advantageous embodiments and implementations are defined in the dependent claims.

In a simple embodiment, the detection means are only configured to detect and report of the presence as such of persons situated in the thermal cabin. Thus, one only detects whether the thermal cabin is unoccupied ("no one is present") or whether at least one person is situated therein. According to an advantageous embodiment (claim 2), the detection means are further configured to detect the number of persons situated in the thermal cabin. On the basis of this additional information, the heating power to be applied can be controlled in a more differentiated manner.

Although the presence-dependent control of the heating means provided according to the present invention allow for a considerable reduction in the energy requirement, it is advantageous (claim 3) if the detection means further interact with a ventilation control device for the ventilation means in such manner that a base air flow rate is set when no one is present and that a comparatively higher operational air flow rate is set when someone is present. Accordingly (claim 14), in an advantageous manner, the ventilation means are operated with a basic air flow rate when no one is present and are operated with a comparatively higher operational air flow rate when someone is present.

Devices for detecting the presence or number of persons in a defined room are basically known and can also be used accordingly within the scope of the present invention, provided that the sensors used for this purpose are compatible with the temperature and humidity conditions prevailing in the thermal cabin. To increase reliability, it may be appropriate, to use several sensors, in particular also several sensor types. According to an advantageous embodiment (claim 4), the detection mean comprise at least one infrared sensor and one door contact device.

The thermal device according to the present invention can be implemented in diverse embodiments, whereby, in particular, various types of heating means are possible. In one embodiment (claim 5), the adjustable heating means are configured as a sauna oven. As is well known, this is an oven encased in stones or the like, which acts to a certain extent as a heat accumulator.

In a further embodiment (claim 6), the adjustable heating means are configured as a steam generator as they are used in particular in steam baths, Turkish baths, hammams and the like. Moreover, for example, infrared heaters can also be used as heating means.

Depending on the type, the mentioned heating means are supplied with electricity, gas, oil or geothermal energy (heat pump).

In one embodiment of the method (claim 8), the base heating power is substantially constant. As already mentioned at the beginning, the base heating power can be zero (claim 9), in other cases it is maintained at a base value to be determined in advance. Alternatively (claim 10), the base heating power is controlled in such manner that a predefined base temperature range is maintained in the thermal cabin. These measures ensure that the temperature in the thermal cabin does not drop too much even during longer periods of vacancy. In the latter case, an undesirable waiting time until the intended cabin temperature is reached would have to be tolerated when a person enters after a longer period of vacancy.

In one embodiment (claim 11), the operational heating power, which is used when people are present in the thermal cabin, is substantially constant. In a further embodiment (claim 12), the operational heating power is set according to the number of persons present in the thermal cabin. This embodiment does not necessarily require that a different operative heating power is set for each number of persons. In particular, in the case of larger thermal devices, it can be appropriate to set the operational heating power according to a stepwise criterion such as "1 to 2 persons", "3 to 5 persons" and "more than 5 persons".

According to another embodiment (claim 13), the operational heating power is controlled in such manner that a predefined effective temperature range is maintained in the thermal cabin. Also in this case, one basically determines in the manner according to the invention whether a person is present in the thermal cabin or not, and only in the case when someone is present, one generally switches to a comparatively higher operational heating power. However, the latter is now finely controlled with the aid of a temperature sensor provided for this purpose.

BRIEF DESCRIPTION OF THE DRAWINGS

Examples of the invention will henceforth be described in more detail by reference to the drawings, which show.

b) the method according to the present invention during winter operation;

c) the method according to the present invention during summer operation.

MODES FOR CARRYING OUT THE INVENTION

Figure 1:
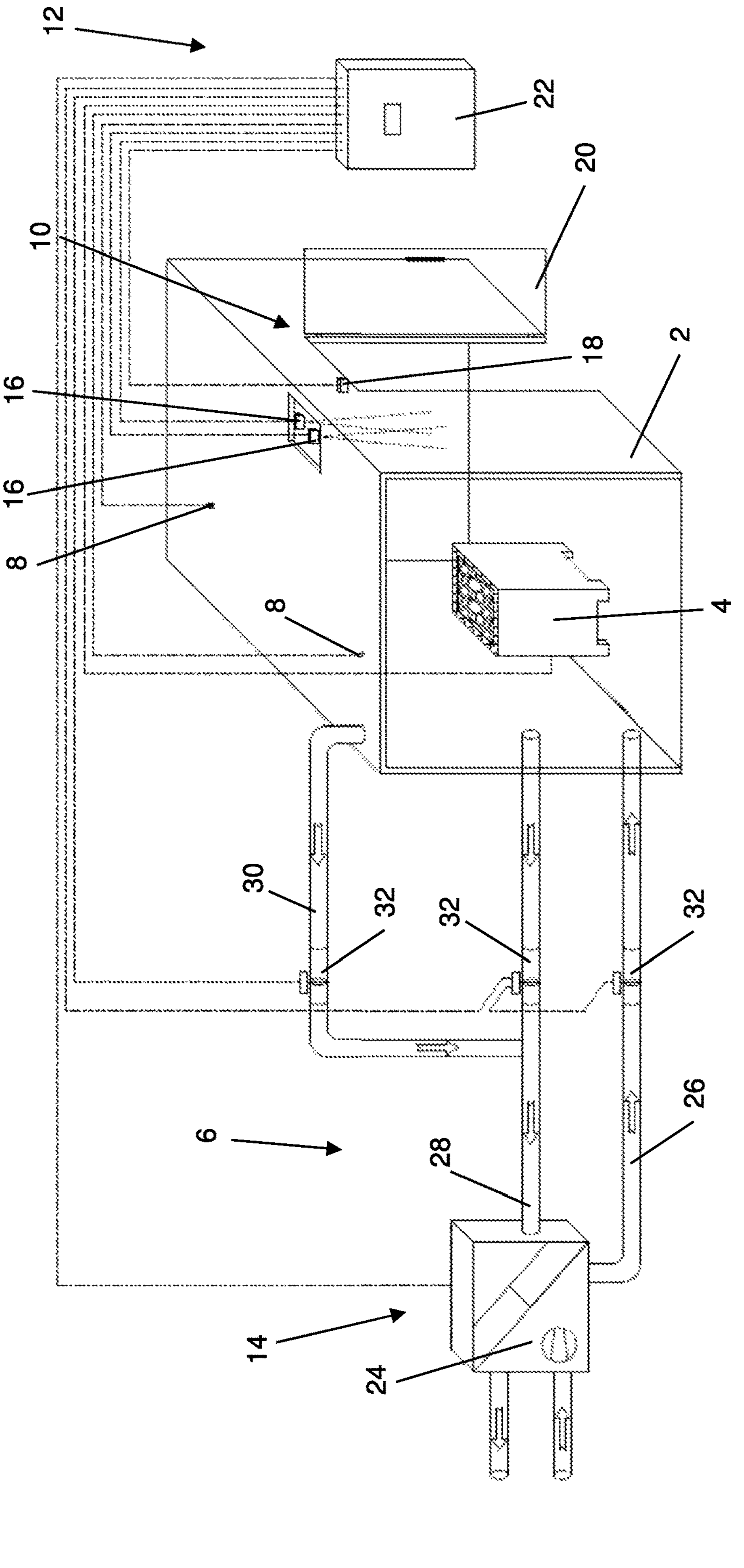
FIG. 1 a schematic view of a thermal device according to the present invention, in a perspective view.

The thermal device shown in FIG. 1 comprises a heatable and ventilatable thermal cabin 2, which is equipped with adjustable heating means 4 in the form of a sauna oven. In addition, the thermal device comprises ventilation means, generally referred to as 6, and two temperature sensors 8. In addition, detection means, generally referred to as 10, for the continuous detection of the presence of persons situated in the thermal cabin are provided, wherein the detection means interact with a heating control device 12 for the heating means 4. The configuration shown allows to set a base heating power when no one is present, i.e., when the thermal cabin is empty, and to set a comparatively higher operational heating power when someone is present.

In the example shown, the detection means 10 are further connected to a ventilation control device 14 for the ventilation means 6. This allows to set a base air flow rate when no one is present and to set a comparatively higher operational air flow rate when someone is present.

In the example shown, the detection means 10 comprise two infrared sensors 16 positioned above the entrance area and one door contact device 18, which is in connection with the cabin door 20.

As also shown schematically in FIG. 1, the heating control device 12 can be implemented as a central control unit 22, which is in contact with the various sensors and control elements via appropriate lines. These may be both wire connections as well as wireless connections.

The ventilation means 6 comprise a fan unit 24 connected to the control unit 22, a supply air line 26, an exhaust air line 28 and, here, also an additional night drying line 30, which are equipped with controllable flaps 32.

Figure 2:
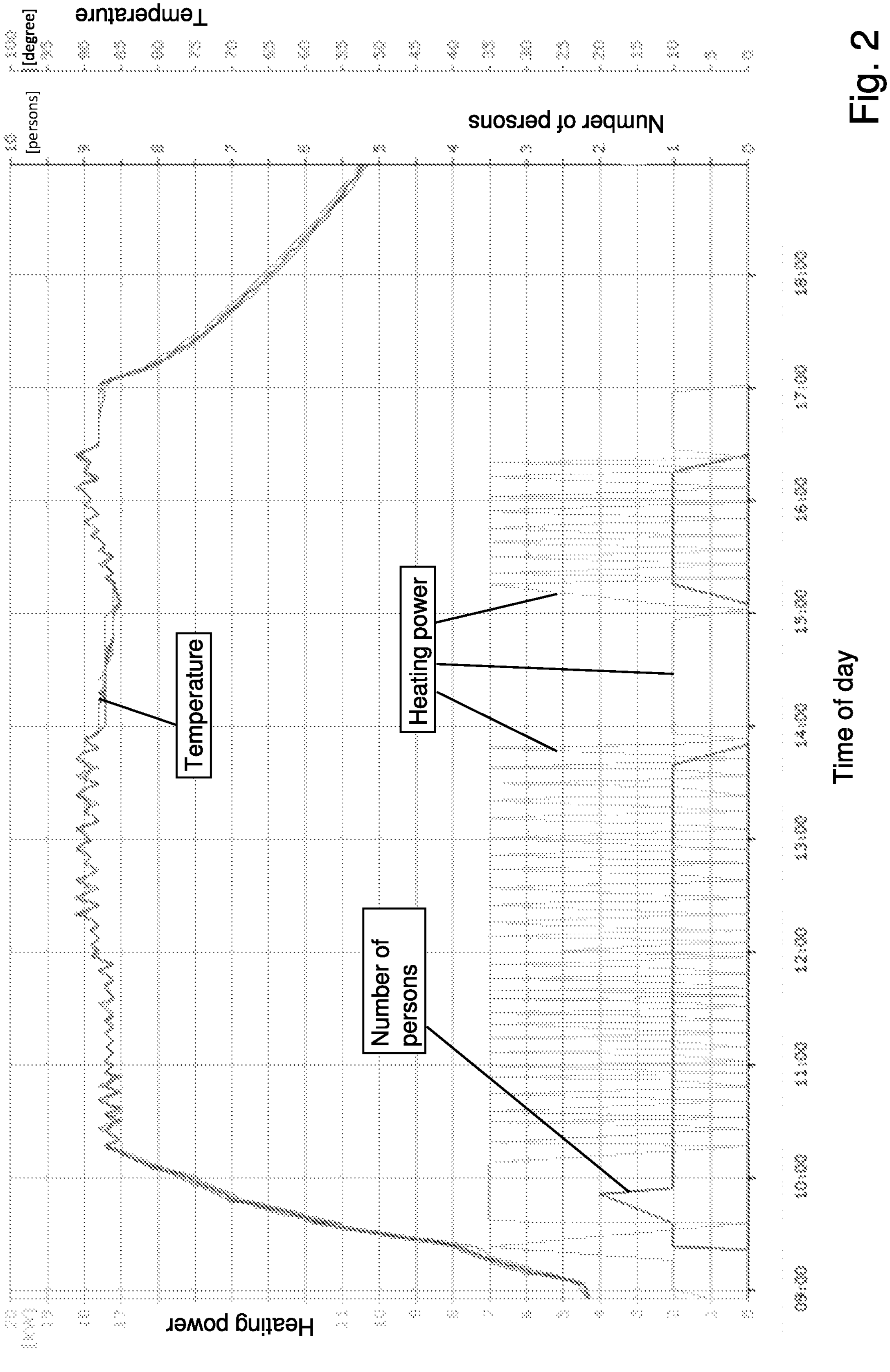
FIG. 2 an exemplary operating diagram when using the method according to the present invention, and FIG. 3 in each case, an exemplary operating diagram when using a) a method according to prior art.

The operation of a thermal device according to the present invention is shown in FIG. 2 using the example of a sauna. The profile referred to as "temperature" actually consists of three curves, namely the measured values from two temperature sensors and the mean value thereof. The two measurement curves are practically congruent, and accordingly, also their mean value.

During the day there was mostly one person present, but occasionally there were two persons or no person in the sauna cabin. The operational heating power was provided as impulse operation with 7 kW peak power each time; a continuous feed of 1 kW was used as base heating power.

In the initial phase up to around 10.15 h, the cabin temperature was raised after the night break. From about 13.45 h to about 15.15 h, the sauna cabin was empty.

In this phase of absence, the heating power was reduced considerably, whereas the ventilation rate was not changed. In this example, despite the reduction of the heating power, there was only a very slight temperature decrease of about 5° C., which would not even be noticed by a subsequently entering person.

A further example for the operation of a thermal device according to the present invention in comparison to a conventional thermal device is shown in FIG. 3.

As in the previous example, the profile referred to as "temperature" actually consists of three curves, namely the measured values from two temperature sensors and the average value thereof. The two measurement curves are practically congruent, and accordingly also their mean value.

Figure 3A:
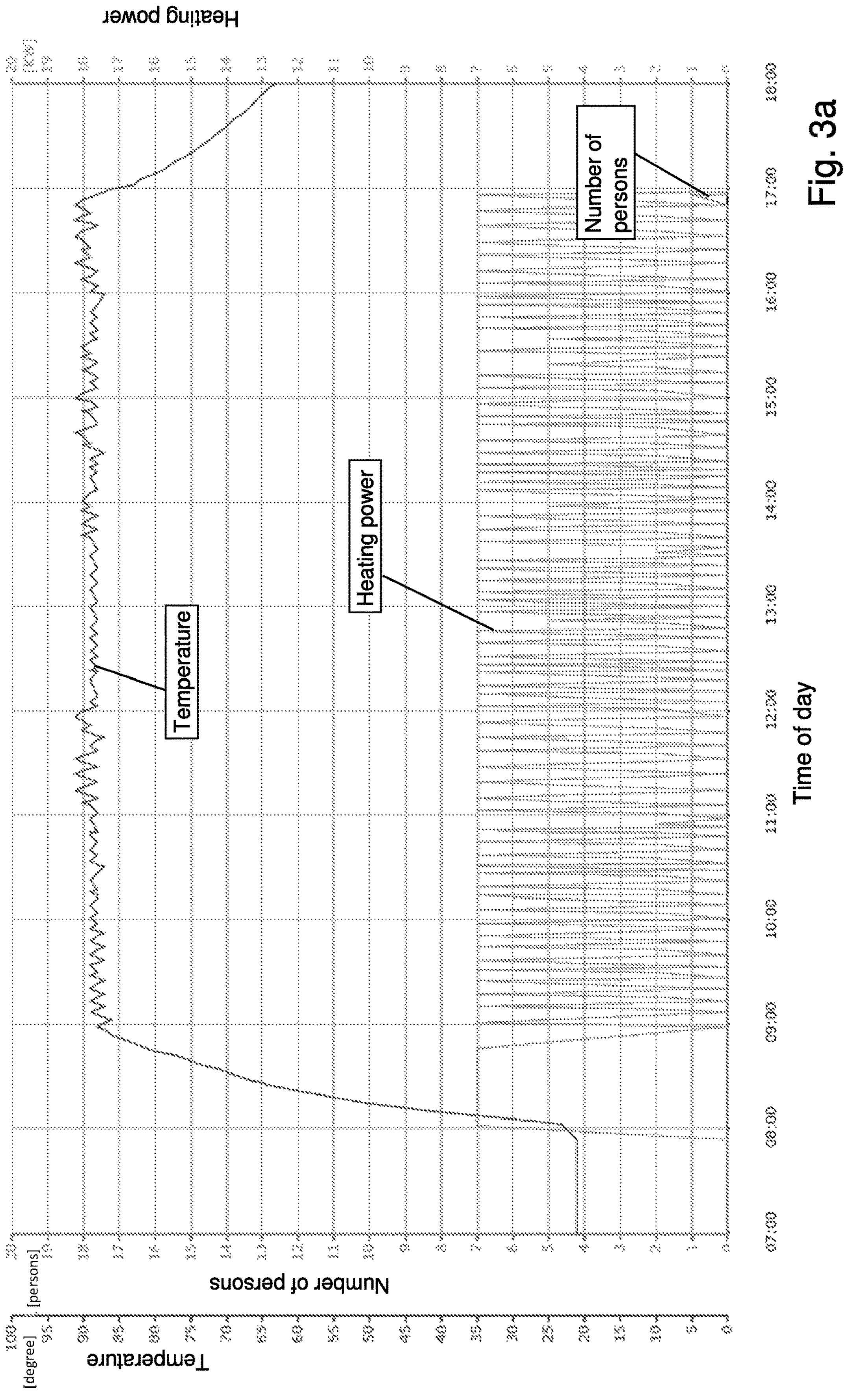

In the comparative example of FIG. 3*a*, a conventional thermal device was operated with a heating power operating in pulsed mode but substantially constant, which was in particular independent of the number of persons in the sauna cabin. As expected, the temperature was maintained largely constant in the range of approximately 87 and 91° C. Incidentally, the same behavior would be expected with the thermal device according to the present invention, if it were operated in the empty state. The heating energy averaged over the entire measurement period shown was 30.72 KWh.

Figure 3B:
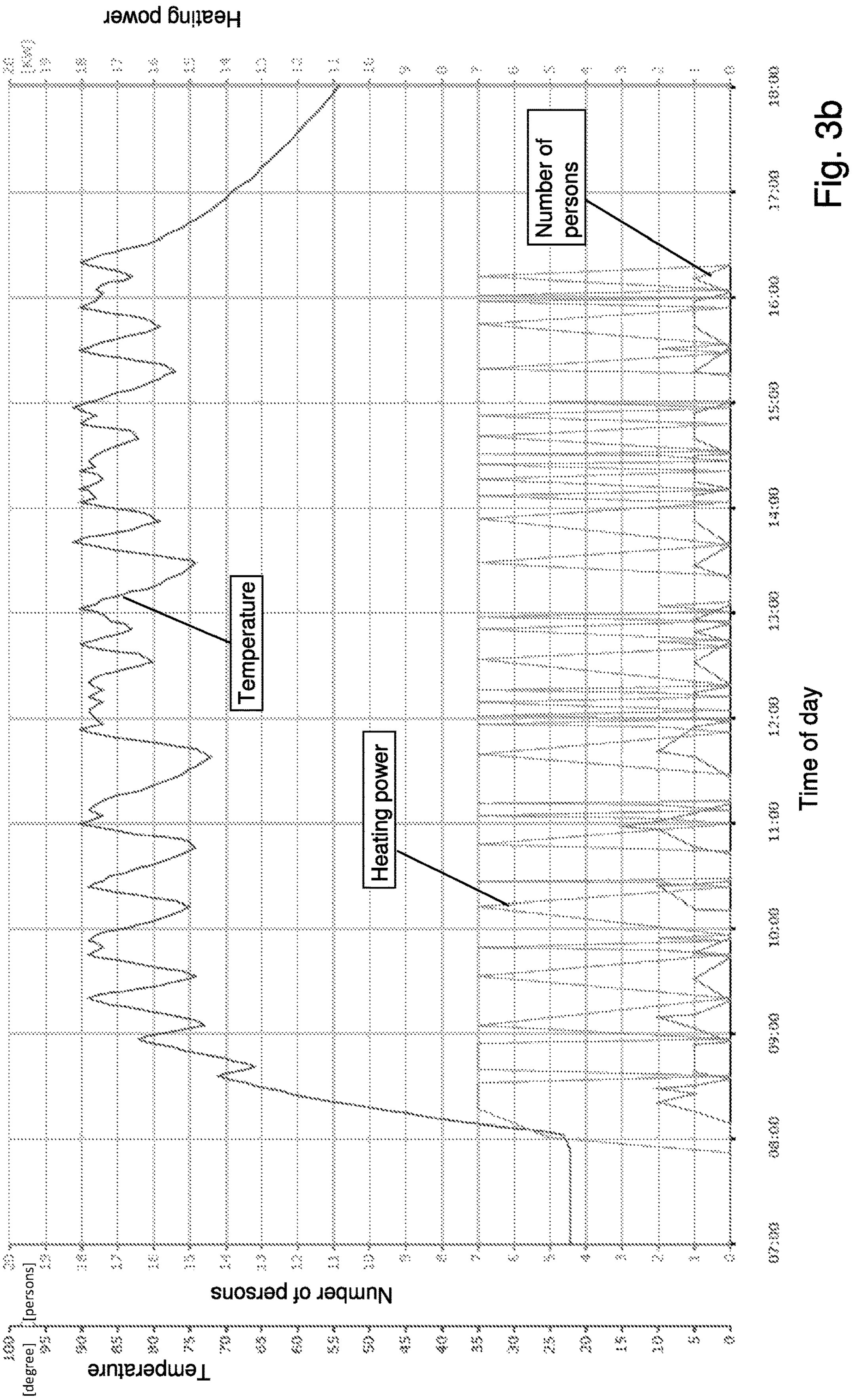

In the example of FIG. 3*b*, the thermal device according to the present invention was operated according to a scenario typical for wintertime or comparatively high frequency of use. The set temperature was selected as 90° C. and the minimum temperature as 50° C. As can be seen from the curves, the heating power was controlled depending on the instantaneous number of persons. After the initial warm-up phase, the cabin temperature could be maintained in a well acceptable range between approximately 73 and 90° C. The heating energy averaged over the entire measurement period shown was 28.55 KWh, which represents a saving of approximately 8% compared with the comparative example in FIG. 3*a*.

Figure 3C:
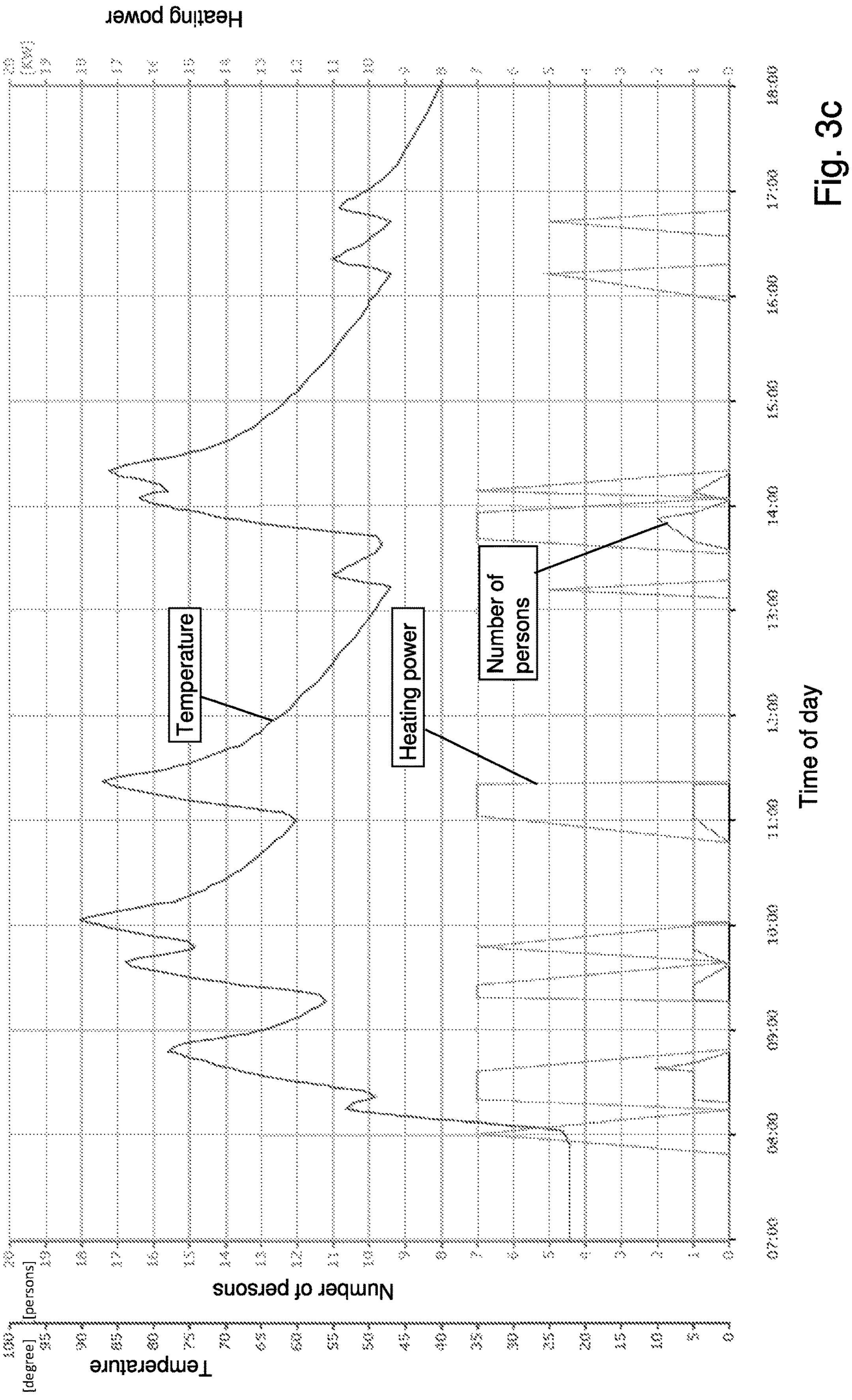

In the example of FIG. 3*c*, the thermal device according to the present invention was operated according to a scenario typical for summertime or comparatively low frequency of use. The set temperature was again selected as 90° C. and the minimum temperature as 50° C. As can be seen from the curves, the heating power was again controlled depending on the instantaneous number of persons. After the initial warm-up phase, the cabin temperature was maintained in an acceptable range between approximately 50 and 90° C. The heating energy averaged over the entire measurement period shown was only 10.76 KWh, which represents a very considerable saving of approximately 65% compared with the comparative example in FIG. 3*a*.

The invention claimed is:

1. A thermal device comprising:

a heatable and ventilatable thermal cabin for at least one person, wherein the thermal cabin is equipped with adjustable heating means and with adjustable ventilation means, wherein the thermal cabin comprises:

detection means for the continuous detection of a presence of persons situated in the thermal cabin, wherein said detection means interact with a heating control device for the heating means in such manner that a base heating power is set when no one is present in the thermal cabin and that a comparatively higher operational heating power is set when someone is present in the thermal cabin.

2. The thermal device according to claim 1, wherein the detection means are further configured to detect a number of the persons situated in the thermal cabin.

3. The thermal device according to claim 2, wherein the detection means further interact with a ventilation control device for the ventilation means in such manner that a base air flow rate is set when no one is present in the thermal cabin and that a comparatively higher operational air flow rate is set when someone is present in the thermal cabin.

4. The thermal device according to claim 3, wherein the detection means comprise at least one infrared sensor and at least one door contact device.

5. The thermal device according to claim 3, wherein the adjustable heating means are configured as a sauna oven.

6. The thermal device according to claim 3, wherein the adjustable heating means are configured as a steam generator or as an infrared heater.

7. The thermal device according to claim 1, wherein the detection means further interact with a ventilation control device for the ventilation means in such manner that a base air flow rate is set when no one is present in the thermal cabin and that a comparatively higher operational air flow rate is set when someone is present in the thermal cabin.

8. The thermal device according to claim 1, wherein the detection means comprise at least one infrared sensor and at least one door contact device.

9. The thermal device according to claim 1, wherein the adjustable heating means are configured as a sauna oven.

10. The thermal device according to claim 1, wherein the adjustable heating means are configured as a steam generator or as an infrared heater.

11. A method for operating a thermal device according to claim 1, wherein the heating means are operated with a base heating power when no one is present in the thermal cabin and are operated with a comparatively higher operational heating power when someone is present in the thermal cabin.

12. The method according to claim 11, wherein the base heating power is set to be constant.

13. The method according to claim 12, wherein the base heating power is zero.

14. The method according to claim 11, wherein the base heating power is controlled in such manner that a predefined base temperature range is maintained in the thermal cabin.

15. The method according to claim 11, wherein the operational heating power is set to be constant.

16. The method according to claim 15, wherein the operational heating power is set according to the number of the persons present in the thermal cabin.

17. The method according to claim 11, wherein the operational heating power is controlled in such manner that a predefined effective temperature range is maintained in the thermal cabin.

18. The method according to claim 11, wherein the ventilation means are operated with a basic air flow rate when no one is present in the thermal cabin and are operated with a comparatively higher operational air flow rate when someone is present in the thermal cabin.

19. The thermal device according to claim 1, wherein the thermal cabin is further equipped with a temperature sensor.

* * * * *